United States Patent [19]
Kirby

[11] Patent Number: 6,047,179
[45] Date of Patent: Apr. 4, 2000

[54] DEBIT SERVICE SYSTEMS AND METHODS FOR WIRELESS UNITS

[75] Inventor: Richard Steven Kirby, Lutz, Fla.

[73] Assignee: BellSouth Intellectua Property Corporation, Atlanta, Ga.

[21] Appl. No.: 08/804,712

[22] Filed: Feb. 21, 1997

[51] Int. Cl.[7] .................................................. H04Q 7/20
[52] U.S. Cl. ........................................... 455/432; 455/406
[58] Field of Search .................................... 455/406, 408, 455/411, 432, 433, 426, 445

[56] References Cited

U.S. PATENT DOCUMENTS

| | | | |
|---|---|---|---|
| 5,537,474 | 7/1996 | Brown et al. | 455/411 |
| 5,668,875 | 9/1997 | Brown et al. | 455/411 |
| 5,670,950 | 9/1997 | Otsuka | 455/411 |
| 5,778,313 | 7/1998 | Fougnies | 455/409 |
| 5,799,249 | 8/1998 | Kennedy, III et al. | 455/411 |
| 5,862,481 | 1/1999 | Kulkarni et al. | 455/432 |

*Primary Examiner*—Edward F. Urban
*Assistant Examiner*—Tilahun Gesesse
*Attorney, Agent, or Firm*—Jones & Askew LLP

[57] ABSTRACT

Systems and methods for exchanging information, and particularly debit information, between a visited and a home wireless network with respect to a wireless unit operating in the visited network. A translator is provided which includes a receiver for receiving data relating to the unit from the visited network, a translator application for translating and/or formatting the data into a standard inter-network communications message, and a transmitter for transmitting the standard message to the home network. The translator may receive data from a debit platform of the visited network. The translator may format the data into the standard message, preferably an IS-41 message. This standard message may be received by a translator at the home network. The home translator may extract the data from the standard message, translate the data and provide the data to the debit platform of the home network. After the home debit platform determines the authorization information with respect to the unit, the home translator may translate and format the authorization information into a standard inter-network communications response message, preferably, an IS-41 response message. The home translator transmits this standard response message to the visited network, where the visited translator may receive the response message, extract the authorization information, translate this information and then to provide the authorization information to the visited debit platform.

5 Claims, 5 Drawing Sheets

CALL FLOW - CALL TERMINATION
DEBIT CUSTOMER IN A SUBSCRIPTION NETWORK

CALL FLOW - CALL ORIGINATION
DEBIT CUSTOMER IN A SUBSCRIPTION NETWORK

CALL FLOW - CALL ORIGINATION
DEBIT CUSTOMER IN A NON-SUBSCRIPTION NETWORK

CALL FLOW - CALL TERMINATION
DEBIT CUSTOMER IN A SUBSCRIPTION NETWORK

DEBIT SERVICE SYSTEMS AND METHODS FOR WIRELESS UNITS

FIELD OF THE INVENTION

This invention generally relates to the field of telecommunications, and particularly relates to the exchange of information between wireless networks with respect to a specific wireless unit. Even more particularly, embodiments of this invention relate to a debit service system for wireless units and methods of operation of a debit service with respect to wireless units.

BACKGROUND OF THE INVENTION

"You get what you pay for" is an aphorism that is particularly apt with respect to prepaid telecommunication services. Generally, such prepaid services are offered in conjunction with a debit phone or a telecommunications unit including a debit card, which collectively are referred to herein as a "debit unit". Further, debit units are typically cellular telephones or units associated with a personal communication system (PCS). Debit units with prepaid telecommunication services offer convenience to the customer and relative certainty of income to the telecommunications service provider. In particular, prepaid telecommunication services are advantageous for the customer because, once prepaid, such services are generally delivered without the need for further extensive authorization or validation procedures such as credit card authorization, entry of special personal identification numbers (PINs), etc. Further, prepaid telecommunication services are advantageous for the service provider because, inter alia, with a group of prepaid customers, the service provider establishes a customer base for the delivery of telecommunication services that may include services other than just prepaid services.

To take advantage of prepaid telecommunication services, generally, a customer subscribes to such services from a service provider by establishing an account and paying a fee into that account. The customer is issued or ascribed a debit unit, and then the customer simply uses the debit unit to place or receive communications. The costs for these communications are calculated and charged against the customer's prepaid account. Once the account is exhausted, the customer is unable to use the debit unit until the account has been replenished.

To service a debit customer with a debit cellular or PCS unit, a service provider may use a debit platform in conjunction with the mobile switching centers (mobile switches) in the service provider's geographic area of service. A debit platform typically includes a call processor and a database. Upon receipt of a communication to or from a debit unit, a mobile switch recognizes the destination station as a debit unit and provides the communication to the call processor of the debit platform. The call processor carries out authorization and validation functions (A/V Functions) in association with the database of the debit platform. If the debit unit is valid and/or authorized for the type of services associated with the communication, then the call processor places a call through the mobile switch to either the debit unit or the number dialed by the customer of the debit unit (depending on whether the communication is to or from the debit unit). If this call is unanswered, then the call processor provides predetermined default treatment. If this call is answered, then the call processor may bridge the communication received from the mobile switch with the call made by the call processor. Typically, the call processor keeps track of information with respect to the communication such as its duration so that the appropriate charges may be made against the customer's account. Once the communication is terminated, the call processor tears down the bridge. The call processor also charges the customer's account for the costs associated with the communication. This customer account information may be stored in the debit platform's database.

With the fast growth of the telecommunication service industry, and especially, with the fast growth of prepaid telecommunication services offered in connection with debit units, service providers have generally acted independently in setting up debit platforms. Thus, the functions carried out by a debit platform are typically as described in the preceding paragraph. Yet, these functions are carried out on debit platform elements that may be unique to a particular service provider. Further, these debit platform functions may be carried out on transport facilities using computer applications, languages or programs that also may be unique to a particular service provider at least with respect to debit platforms. In other words, there is no "standard" debit platform. Each service provider may have its own species of debit platform.

The diversity in debit platforms is a drawback to the expansion of prepaid telecommunication services using debit units. Because of this diversity, a service provider is able to provide telecommunication services to customers using debit units only in the geographic area of that service provider (except in very limited circumstances as described below). In other words, if a customer of a service provider takes a debit unit to a geographic area served by a different service provider, the customer is unable to use the debit unit. The inability of the customer to use the debit unit in a visited area is a drawback to the expansion of the home service provider's prepaid services. This drawback stems from the fact that the debit platform of service provider A cannot communicate with the debit platform of service provider B. As a result, a debit customer of service provider B, who is roaming in the area of service provider A, cannot use his or her debit unit in the visited area. There is no way for the debit platform in the visited area to exchange information with the debit platform in the home area. Thus, there is no way for the debit platform in the visited area to check the validity or authorization of a debit unit that is roaming in the visited area. If the debit platform in the visited area proceeds to deliver telecommunication services to the roaming debit unit, then the associated service provider risks serving a fraudulent or otherwise unauthorized unit. The debit unit may be stolen. The debit unit may not be authorized to receive communications. The service provider risks that it will not be compensated for such delivery of services. In addition, the delivery of unauthorized services is a burden on the infrastructure of the telecommunication facilities of the service provider.

To overcome these drawbacks, service providers who offer debit services have pursued a couple of principal courses of action. One system that has been used to provide debit services to roaming customers has simply avoided the drawbacks associated with the inability of debit platforms to communicate by limiting the authorization and validation process to the home debit platform. This system is referred to herein as the "toll-free number system". In this system, a customer who is roaming with a debit unit may place a call only by first dialing a toll-free telephone number. The need to dial the toll-free telephone number applies even in the case of local calls within the service area where the debit unit is roaming. Upon dialing the toll-free telephone number, the call is connected to the customer's home network. This connection may be made through a national debit platform, which may serve as a home debit platform or to a home debit platform, which is associated with the customer's home wireless network. This connection may be a long distance connection from the visited service area to the home service area. The national or home debit platform then processes this call just as if it were received in connection with a debit unit that is located in the designated home service area rather than a visited service area.

From this brief description of the toll-free number system, it is may be seen that this system does not address the drawbacks associated with the inability of diverse debit platforms to communicate. In the toll-free number system, there is no need for diverse debit platforms to communicate because only one debit platform is involved in the authorization and validation process. Rather, this toll-free number system avoids the described problems, but presents its own set of problems. These problems include the burden placed on the telecommunication facilities by the use of voice channel connections between a debit unit roaming in a visited network and the national or home debit platform in an effort to authorize or validate the roaming unit. Further, it is a burden for a customer to call a number, even a toll-free number, prior to calling the desired number associated with the customer's communication. The customer must remember or carry the toll-free number with him or her. The customer must enter the lengthy toll-free number, rather than simply dialing the desired number. This double number entry is time-consuming, inconvenient, and may even be dangerous if the customer is using the debit unit while operating a vehicle.

In sum, the toll-free system avoids the problems associated with the inability of diverse debit platforms to communicate by teaching away from these problems. The toll-free system teaches away from the problems by using only a single debit platform in serving debit customers.

To overcome the drawbacks associated with the inability of diverse debit platforms to communicate, other service providers have entered into agreements to exchange the necessary information so as to configure their respective debit platforms for communication. But these configurations necessarily must be hard-wired between the platforms, or other connections made between the platforms. For example, these other connections may include use of the voice channels of the cellular networks, PCS or the public switched telephone network. As with the toll-free number system, the use of voice channel connections to exchange authorization and validation information between disparate debit platforms places a burden on telecommunication facilities. Further, to keep their debit platforms communicating, the service providers that have entered into such agreements have to keep up with each other's changes or modifications to their respective platforms and associated information. The continuing exchange of such information between service providers in a competitive environment poses significant difficulties involving business and technological concerns.

In conclusion, the expansion of prepaid telecommunication services using debit units is hampered by the inability of diverse debit platforms to communicate in the process of authorization and validation of roaming debit units. Yet, previous efforts to overcome the drawbacks associated with this inability to communicate have been unsuccessful or fraught with problems and burdens on telecommunication facilities.

Therefore, there is a need for a system that provides for the exchange of information between service providers and between the networks of such service providers with respect to the validity or authorization of a particular debit unit operating in the area of a visited network, but associated with a customer of a different network or service provider.

There is a particular need for a system that provides for the exchange of information with respect to a specific wireless unit between the debit platforms of different service providers.

There is also a need for a system that provides for the exchange of information between the debit platforms of different service providers with respect to a specific wireless unit, but does not use the voice channels of the wireless networks or the public switched telephone network.

SUMMARY OF THE INVENTION

The present invention solves the problems of the prior art by providing methods and systems that facilitate the exchange of information, and in particular, debit information, between wireless networks with respect to a specific wireless unit. As is described briefly in this summary and then with greater particularity in the detailed description, a first type of embodiment of the present invention provides a translator and also provides a method for exchanging information such as debit information relating to a specific wireless unit between a visited wireless network where the unit is roaming and the home wireless network of the unit. Another type of embodiment of the present invention provides a service system and also provides a method for facilitating the transmission of information such as debit information with respect to a roaming wireless unit from the visited wireless network to the home wireless network of the wireless unit. Yet another type of embodiment of the present invention provides a debit service system for obtaining information with respect to providing telecommunication services to a wireless unit in a visited wireless network. The information is obtained from the home wireless network of the unit and used by the visited wireless network. Additional embodiments based on the principles of the present invention described herein will occur to those skilled in the art.

Advantageously, the present invention overcomes the limitations of previous systems and methods by adapting an existing communications network to exchange information such as debit information between wireless networks with respect to a specific wireless unit. Preferably, this existing communications network is the cellular mobile radiotelephone (CMR) system. Telecommunications service providers have already installed the necessary equipment to support nationwide communications to create an overall CMR system through individual CMR networks. The inventor has recognized that the CMR system is an existing communications architecture which can be adapted in a novel manner to supply communications with minimal impact upon the well known communications offered by the CMR system. In particular, the present invention takes advantage of this installed base of equipment of the CMR system by facilitating the exchange of information such as debit information between wireless networks. The present invention obtains information from a wireless network with respect to a specific wireless unit. If necessary, the information may be translated from the protocol used by that wireless network or by an element of that wireless network, such as the debit platform of that wireless network. Then, the present invention formats the information into a standard CMR inter-network message or response message and transmits the standard message to another wireless network. This new use of an existing communications system has only a minimum impact upon present communications carried by the CMR system. The present invention adapts the existing architecture of a CMR system in an efficient and cost-effective manner to facilitate the exchange of information between wireless networks with respect to a specific wireless unit.

Generally, the present invention includes an embodiment that provides a translator for exchanging information such as debit information relating to a specific wireless unit between a visited wireless network where the unit is roaming and the home wireless network of the unit. This translator preferably includes a receiver, a translator application and a transmitter. The translator may be used to send information relating to a specific wireless unit from a visited wireless network to the home wireless network. In this function, the translator is referred to herein as a visited translator for ease of distinction from a translator that may have other functions. To accomplish this transfer of information, the receiver of the translator receives data relating to the wireless unit from an element of the visited wireless network. This element may be a visited debit platform of the visited wireless network. The translator application formats the data into a standard inter-network communications message. If the data is in a protocol particular to the visited wireless network or to an element of the visited wireless network such as the visited debit platform ("visitor's protocol"), that is, if the data is provided in a computer language, application or format particular to the visited wireless network or to the visited debit platform, then the translator may translate the data from the visitor's protocol as necessary. The translator may then format the data into a standard inter-network communications message. The transmitter then transmits the standard inter-network communications message to an element of the home wireless network.

This visited translator also may be used to receive information, such as debit information, about a wireless unit from its home wireless network and to pass this information to the visited wireless network. To accomplish this transfer of information, the receiver of the visited translator receives a standard inter-network communications response message including authorization information relating to the wireless unit from an element of the home wireless network. This element may be a translator referred to as the home translator, if the translator is associated with the home wireless network. The translator application of the visited translator extracts the authorization information relating to the wireless unit from the standard inter-network communications response message. The translator application may translate the authorization information to the visitor's protocol as necessary. The transmitter then transmits the authorization information to an element of the visited wireless network. If appropriate, the transmitter may transmit the authorization information in the visitor's protocol.

Generally, the present invention includes a method for exchanging information relating to a specific wireless unit between a visited wireless network where the unit is roaming and the home wireless network of the unit. Pursuant to one aspect of this method, information relating to a specific wireless unit may be sent from a visited wireless network to the home wireless network. To accomplish this transfer of information, the data relating to the wireless unit is received from an element of the visited wireless network. The data is formatted into a standard inter-network communications message. The data may be translated from the visitor's protocol. The data then may be formatted into the standard inter-network communications message, which is transmitted to an element of the home wireless network.

Pursuant to another aspect of this method, information also may be received about a wireless unit from its home wireless network and this information may be passed to the visited wireless network. To accomplish this transfer of information, a standard inter-network communications response message may be received. This message may be responsive to the standard inter-network communications message. This response message may include authorization information relating to the wireless unit from an element of the visited wireless network. The authorization information relating to the wireless unit is extracted from the standard inter-network communications response message. The authorization information may be translated into the visitor's protocol. The authorization information then is transmitted, and if appropriate, in the visitor's protocol, to an element of the visited wireless network.

In another embodiment, the present invention provides a translator that may be used to receive information relating to a specific wireless unit from a visited wireless network and to pass the information to the home wireless network. In this function, the translator is referred to herein as a home translator for ease of distinction from a translator that may have other functions such as the visited translator. To accomplish this information transfer, the receiver of the home translator receives a standard inter-network communications message including data relating to the wireless unit from an element of the visited wireless network. This element may be a visited translator. The translator application of the home translator extracts the data relating to the wireless unit from the standard inter-network communications message. The translator application may translate the data into the home protocol, i.e., the protocol of the home wireless network or an element of the home wireless network such as the home debit platform. The transmitter transmits the data relating to the wireless unit, and if appropriate, transmits the data in the home protocol, to an element of the home wireless network.

This home translator also may be used to receive authorization information with respect to the wireless unit from the home wireless network and to pass this information on to the visited wireless network. To accomplish this transfer of information, the receiver of the home translator receives authorization information relating to the wireless unit from an element of the home wireless network. This element may be the home debit platform of the home wireless network. The translator application of the home translator formats the authorization information into a standard inter-network communications response message, which is responsive to the standard inter-network communications message. The transmitter then transmits the standard inter-network communications response message to an element of the visited wireless network.

Generally, the present invention also includes a method for exchanging information, such as debit information, relating to a specific wireless unit such that information about a wireless unit roaming in a visited network may be received and transmitted to the home wireless network of the unit. To accomplish this transfer of information, a standard inter-network communications message is received. This standard inter-network communications message includes the data relating to the wireless unit from an element of the visited wireless network. The translator application extracts the data relating to the wireless unit from the standard inter-network communications message. The data may be translated into the home protocol. The data then is transmitted, and if appropriate, in the home protocol, to an element of the home wireless network.

Pursuant to another aspect of this method, information also may be received about a wireless unit from its home wireless network and this information may be passed on to the visited wireless network in response to a received standard inter-network communications message. To accomplish this transfer of information, authorization information is received relating to the wireless unit from an element of the home wireless network. The authorization information is formatted into a standard inter-network communications response message, which is transmitted to an element of the visited wireless network.

As noted above, another type of embodiment of the present invention provides a service system and provides a method for facilitating the transmission of information with respect to a roaming wireless unit from the visited wireless network to the home wireless network of the wireless unit. This embodiment of the service system includes at least two translators. The first translator is associated with the visited wireless network. The first translator includes a receiver that receives data relating to the wireless unit from an element of the visited wireless network such as the visited debit platform. The first translator also includes a first translator application that may translate the data from the visitor's protocol and that formats the data into a standard inter-network communications message. The first translator further includes a first transmitter that transmits the standard inter-network communications message to the second translator. With respect to the other of the two translators, this second translator is associated with the home wireless network. This second translator includes a receiver for receiving the standard inter-network communications message including the data from the first translator. The second translator also includes a second translator application that extracts the data from the standard inter-network communications message, and a second transmitter that transmits the data to an element of the home wireless network. The translator application of the second translator may translate the data into a home protocol The transmitter of the second translator then may transmit the data in the home protocol.

In addition to the service system described in the immediately preceding paragraph, this type of embodiment of the present invention includes a method for transmitting information with respect to a wireless unit in a visited wireless network from the visited wireless network to the home wireless network. This method provides that, at the first element which is associated with the visited wireless network, data is received which relates to the wireless unit. The data may be received from another element of the visited wireless network. The data may be translated from the visited protocol of the visited wireless network. The data then is formatted into a standard inter-network communications message, and the standard inter-network communications message is transmitted to a second element. At the second element, which is associated with the home wireless network, the standard inter-network communications message including the data from the first element is received. The data then is extracted from the standard inter-network communications message, and if appropriate, the data may be translated into a home protocol. The data is transmitted, in the home protocol if appropriate, to an element of the home wireless network.

Also as noted above, the present invention provides yet another type of embodiment. This embodiment includes a debit service system for obtaining authorization information with respect to providing telecommunication services to a wireless unit in a visited wireless network. The authorization information is obtained from the home wireless network of the unit and used by the visited wireless network. This embodiment preferably includes a visited debit platform, a visited translator, a home translator and a home debit platform. Pursuant to this embodiment, the visited debit platform provides data relating to the wireless unit to a visited translator. The visited debit platform may provide the data in a visitor's protocol to the visited translator. This visited translator is associated with the visited wireless network and is functionally connected to the visited debit platform. The visited translator is operative to receive the data from the visited debit platform, and if appropriate, to translate the data from the visitor's protocol. The visited translator then includes the data in a message. The message is formatted by the visited translator as a standard inter-network communications message. The visited translator then transmits the message to the home wireless network, and in particular, to the associated home translator.

In this embodiment, the home translator is operative to receive the message, to extract the data from the message, to translate the data into a home protocol, if appropriate, and to provide the data to a home debit platform. The home debit platform is functionally connected to the home translator and is associated with the home wireless network. The home debit platform is operative to receive the data from the home translator, to determine the authorization of the wireless unit, and to provide authorization information to the home translator. The home debit platform may provide the authorization information in a home protocol to the home translator. The home translator then is further operative to receive the authorization information from the home debit platform and to include the authorization information in a response message. The home translator may translate the authorization information from the home protocol. The response message is formatted by the home translator as a standard inter-network communications response message, and then to transmit the response message to the visited wireless network. In turn, the visited translator is further operative to receive the response message, to extract the authorization information from the response message, and to provide the authorization information to the visited debit platform. The visited translator may translate the authorization information into a visitor's protocol. Finally, the visited debit platform then provides the authorization information to the visited wireless network.

The present invention has been briefly summarized above in the context of three types of embodiments including apparatus, systems and methods for each type of embodiment. Those skilled in the art will appreciate that the principles of the present invention may be applied to virtually any type of information exchange between wireless networks, and that the present invention is not limited to the embodiments discussed above.

Therefore, it is an object of the present invention to provide a system and method that provide for the exchange of information such as debit information through standard inter-network communication messages and response messages between service providers and between the networks of such service providers.

It is also an object of the present invention to provide a system and method that provide for the exchange of information with respect to a specific wireless unit between the debit platforms of different service providers and/or different wireless networks.

It is a further object of the present invention to provide a system and method that provide for the exchange of information between the debit platforms of different service providers with respect to a specific wireless unit, but do not use the voice channels of the wireless networks or the public switched telephone network for the information exchange.

It is yet another object of the present invention to provide a system and method that provide for the exchange of information such as debit information through the use of standard inter-network communication messages between wireless networks with respect to the validity or authorization of a particular debit unit operating in the area of a visited network, but associated with a customer of a different network or service provider.

DETAILED DESCRIPTION

The Preferred Environment

Figure 1:
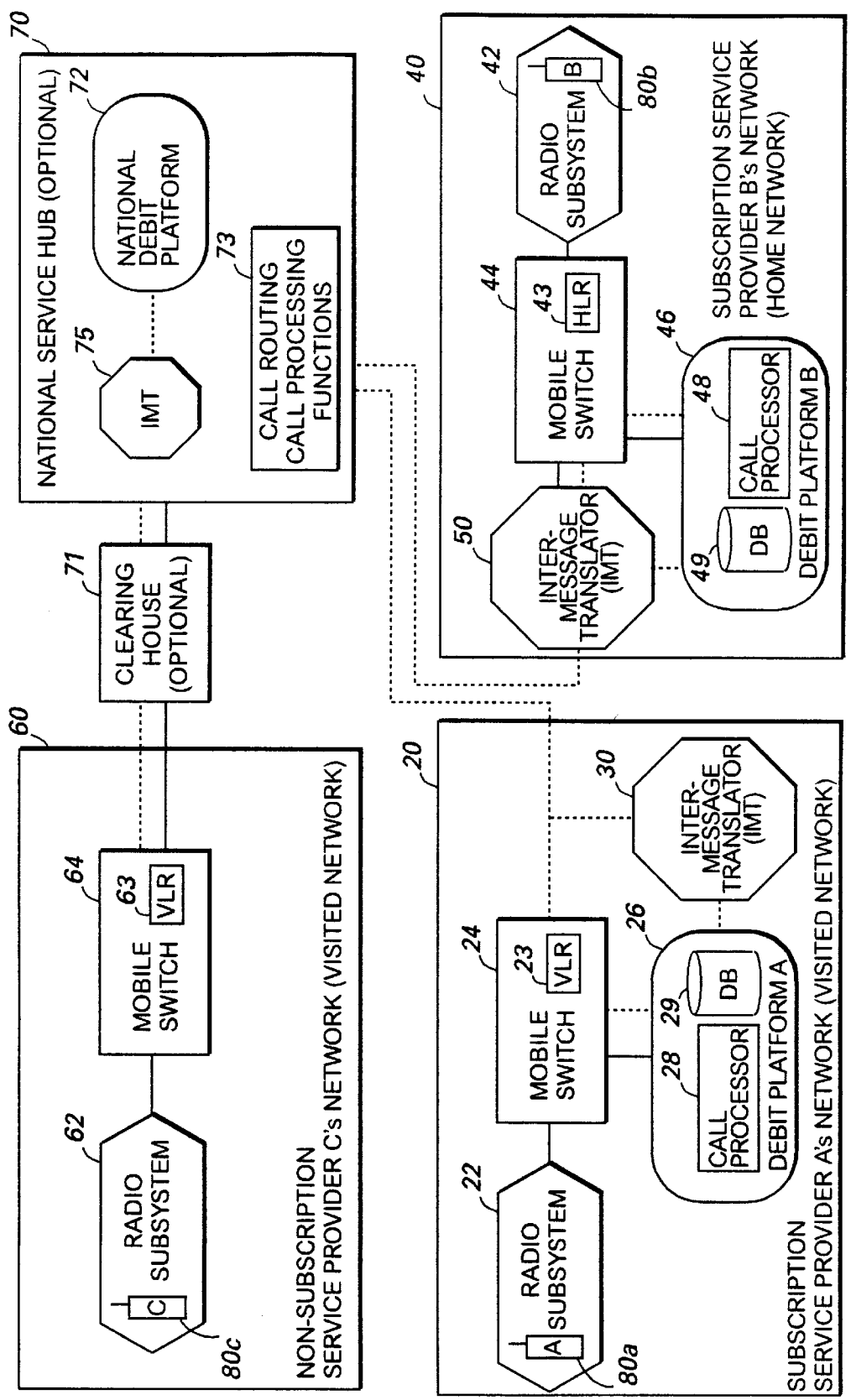
FIG. 1 is a diagram of an exemplary environment for operation of exemplary embodiments of the present invention.

Referring now to the drawings, in which like numerals indicate like elements throughout the several figures, FIG. 1 is a diagram of an exemplary environment for operation of exemplary embodiments of the present invention. The illustrated elements three wireless networks 20, 40 and 60, a (cellular) clearinghouse 71 (optional), and a national service hub 70. These wireless communication system elements communicate conventionally through voice channels (solid lines) and through data links (dashed lines). (Not all communication (voice or data) links are shown, but will be clear to those skilled in the art.) The wireless networks 20, 40 and 60 are illustrated as connected conventionally to and through a national service hub 70. One of the cellular networks 60 is illustrated as connected to the national service hub 70 and other networks 40 and 60 through an optional cellular clearinghouse 71. FIG. 1 also illustrates three wireless units 80a, 80b, and 80c. Each of these principal elements is defined prior to an explanation of the interaction of these elements in connection with the exemplary embodiments of the present invention. It is assumed that the interconnection of wireless networks and the interconnection of wireless networks through the public switched telephone network is well known to those skilled in the art. For further information regarding the public switched telephone network (PSTN), the interested reader is referred to the patent to Weisser, U.S. Pat. No. 5,430,719, which is incorporated herein by reference.

Generally, the present invention provides methods and systems that facilitate the exchange of information such as debit information in standard inter-network communications messages or response messages between wireless networks with respect to a specific wireless unit. A wireless network is defined as a cellular mobile radiotelephone (CMR) network, a personal communication service (PCS) system, as well as any other telecommunications network that does not depend entirely on wireline or landline connections for communications. The exemplary embodiments are described with reference to three exemplary wireless networks 20, 40 and 60 and with reference to a national service hub 70. Two of these wireless networks 20, 40 are labeled as subscription networks, to-wit: subscription service provider A's network (network A) 20; and subscription service provider B's network (network B) 40. As used herein, a subscription network is a wireless network whose associated service provider has subscribed to be a participant in a debit service system that includes the present invention or aspects thereof. Advantageously, by this subscription, the service provider may use the debit services that are further described in greater detail below to determine certain information with respect to a customer in the service provider's area. In particular, the service provider may use the debit services to determine whether the customer is authorized to make and/or receive communications via the wireless unit. If the customer is authorized, then the subscription service provider may choose to facilitate the connection of communications made to or from the customer. If the customer is unauthorized, then the subscription service provider may choose to block the connection of communications made to or from the customer.

One of the wireless networks in FIG. 1 is labeled as non-subscription service provider C's network (network C) 60. As used herein, a non-subscription network is a wireless network whose associated service provider has not subscribed to be a participant in a debit service system that includes the present invention or aspects thereof. Nonetheless, as is described in greater detail below, exemplary embodiments of the present invention operate so that a customer of a subscription service provider may receive debit services when the customer is roaming in the area of a non-subscription service provider. These exemplary embodiments may operate in connection with a cellular clearinghouse 71 and/or a national service hub 70. Advantageously, this feature of the exemplary embodiments allow a subscription service provider to better serve its customers with respect to telecommunication services.

FIG. 1 also illustrates a number of exemplary wireless units 80a, 80b and 80c operating within the wireless networks 20, 40 and 60, respectively. A "wireless unit" is defined as a communications device that operates in a telecommunications system or network without being connected to a system or network element by a wireline or landline. A wireless unit may be a wireless telephone, a PCS unit, a pager, a modem, a facsimile machine, a computer, an answering machine or other device as will occur to those skilled in the art.

Further, a wireless unit may be a debit or pre-paid telephone unit or have a debit or pre-paid card or program associated with it. Based upon the prepayment of a specified fee by the customer using the debit unit, such a debit unit is authorized to receive or transmit communications or otherwise to receive telecommunication services generally for a predetermined period of time. These services may or may not include long distance telecommunication services depending upon the agreement between the customer and the service provider providing the services.

The user of a wireless unit is generally referred to herein as the customer unless otherwise noted, whether or not the user actually pays the "custom" for the wireless service. A customer also is referred to as a "subscriber" in terms of subscribing to telecommunications service from a particular service provider. But to avoid confusion between a subscriber of a service provider and a service provider as a subscriber to a debit service system, the term "customer" is used to refer to the user of a wireless unit. Also, the definition of a customer is not limited to a person, but may include a device such as an answering machine, computer, etc.

FIG. 1 further illustrates that non-subscription service provider C's network 60 communicates in a conventional manner with the other networks 20, 40 through a clearinghouse 71 and/or a national service hub 70. This national service hub 70 represents a facility for routing, processing or otherwise handling cellular communications, and as such, the national service hub 70 may include certain functionality such as call routing and call processing functions 73. These call routing and call processing functions 73 may include functions that are handled by a service control point (SCP) and/or a service transfer point (STP). Further, the national service hub 70 may include a national debit platform 72, or the national debit platform 72 may be separate from the national service hub 70. The national debit platform 72 typically is a facility for keeping track of debit units and the prepaid services to be accorded to the debit units. This service hub 70 and the debit platform 72 are defined as "national" because they may not be associated with any particular wireless network, and in fact, may serve more than one wireless network. Typically, a service provider that has only basic call routing or call processing functions may engage the facilities of a national service hub 70. Further, a service provider that does not have a debit platform may engage the facilities of a national debit platform.

Prior to an explanation of the interaction of the principal elements associated with the exemplary embodiments of the present invention, additional details are provided with respect to the illustrated wireless networks 20, 40 and 60. A typical wireless network such as any of the illustrated networks 20, 40 and 60 includes a geographic service area as represented by the respective cells 22, 42 and 62 of each network 20, 40 and 60. Generally, the geographic service area of a wireless network includes a plurality of cells. A cell such as cell 22, 42 or 62 is served by a broadcast antenna (not shown) to permit communications between a wireless unit operating within the cell and a cell control (not shown). The cell control communicates with a mobile switching center (MSC) such as mobile switches 24, 44 or 64 by dedicated telephone facilities (not shown) or, more frequently, by a cell-to-mobile switching center datalink between the cell control and the mobile switch. Further, the mobile switches 24, 44 and 64 generally couple telecommunications involving units operating in their respective cells or service areas to the public switched telephone network (PSTN) or through the PSTN to other wireless networks. The routing and coupling of telecommunications may be facilitated by a wireless clearinghouse 71 as will be well understood by those skilled in the art.

Generally, a customer subscribes to wireless service from a particular service provider. The geographic area served by that service provider is typically referred to as the customer's "home service area or home network". When a customer attempts to use a unit in an area that is outside this home service area, the customer is described as a "roamer" who is roaming in a "visited service area or visited network". When a unit first powers up or first enters an area served by a wireless network when already powered, the unit identifies itself as active by "registering" with that network through a process known as autonomous registration. The unit supplies an autonomous registration signal in the form of a data packet through cell control to the mobile switch. The autonomous registration signal, also referred to as a registration or identification signal, typically includes data such as a mobile identification number (MIN) and an electronic serial number (ESN) of the wireless unit. In a well known manner, the mobile switch ascertains whether the mobile unit is a customer of the local wireless service provider or a roamer.

If the customer is a roamer, the mobile switch sends a message to the home network for that roamer. This message requests information about the validity of the mobile identification number and other information for the unit. The home network responds by transmitting a response message containing the requested information. If the response message indicates that the unit is valid, the mobile switch in the visited network then adds the roamer to its list of registered users, generally stored in a visitors' location register (VLR). The home network adds the customer to its list of roamers that are out of the home service area. This validation process is typically carried out through the use of data communications and data links.

The data message and radio channel specifications for U.S. cellular radiotelephone systems are set forth in Electronic Industries Association/Telecommunications Industry Association (EIA/TIA) Standard 553, implemented in accordance with 47 C.F.R. § 22, in the Report and Orders pertaining to Federal Communications Commission (FCC) Docket No. 79-318. Copies of the EIA/TIA-553 may be obtained from the Engineering Department of the Electronic Industries Association at 2001 Pennsylvania Avenue, N.W., Washington, D.C., U.S.A. 20006. In particular, the protocol that defines communications between cellular systems is known as the EIA/TIA Interim Standard 41 (IS-41 standard) (as revised). The IS-41 standard allows cellular calls to be handled between dissimilar cellular systems. In addition, the IS-41 standard permits a communications exchange for verifying whether a cellular caller is a valid cellular service customer. The preferred embodiment is described through the use of messages and response messages that conform to the IS-41 standard. An IS-41 message may be transported between switches using various network communications protocols. Such protocols include the Signal System 7 (SS7) protocol, X.25 protocol and frame relay protocols. Nevertheless, those skilled in the art will understand that the principles of the present invention may be implemented through the use of other signaling protocols.

As noted above, a wireless unit may be a debit unit. Typically, a debit unit is associated with a particular service provider, and with the wireless network of the particular service provider. For example, referring to FIG. 1, a customer may have prepaid service provider A associated with network A 20 for telecommunication services to be provided to wireless or debit unit 80a. To keep track of debit units and the prepaid services to be accorded to the debit units, a wireless network that provides debit units generally includes a debit platform such as debit platform A 26 in network 20 or debit platform B 46 in network 40. The debit platform is typically connected to the mobile switch via voice trunks and a signaling datalink. Usually, a debit platform 26, 46 includes a call processor 28, 48 and a database 29, 49 that stores customer information and provides procedural instructions to the call processor. For example, when debit unit 80a uses the telecommunication services of network A 20, information with respect to such usage is passed from mobile switch 24 to the debit platform 26. At the debit platform, the call processor 28 and the database 29 process the information and keeps track of it with respect to the debit unit 80a so that the debit unit 80a receives telecommunication services only to the extent that such services have been prepaid or otherwise authorized. This general description of a debit platform and the description provided below also apply to the overall functions of the national debit platform 72. In particular, the national debit platform may include a call processor (not shown) and a database (not shown) as described above.

In accordance with the exemplary embodiments of the present invention, a debit platform includes certain functionality. The debit platform preferably supports a set of announcements that may be communicated to the customer of the wireless unit as part of the authorization of telecommunication services or as part of the processing of such services. For example, an announcement may provide a user with call status, account status, or the prepaid time remaining with respect to the telecommunication services. The debit platform also preferably supports a set of functions with respect to the authorization and processing of telecommunication services. For example, the debit platform preferably includes: a timer for timing a communication or other services; a processor for keeping track of the diminishment of an account balance with respect to the use of telecommunication services; a means to play or to effectuate playing tones to indicate the expiration of a certain amount of time with respect to provided telecommunication services, or to indicate a certain amount of time remaining with respect to the continued delivery of such services based upon a prepaid account or fee; and a mechanism to terminate or to effectuate the termination of telecommunication services upon the exhaustion of the prepaid account or fees. Further, the debit platform preferably is able to communicate with a device such as the translators described below so as to exchange information with respect to wireless units operating within the connected wireless networks.

Of the three wireless networks illustrated in FIG. 1, two of the networks 20, 40 have been deemed to be subscribers to a debit service system that incorporates the present invention or aspects thereof (hereinafter "debit service system"). The other network C 60 has been deemed a non-subscriber to the debit service system 10. Network C 60 does not include a debit platform, and thus, it may be assumed that service provider C does not offer debit units to customers. Alternatively, service provider C may offer debit units to customers, but rely on a national debit platform 72 to keep track of debit units and the prepaid services to be accorded to the debit units.

General Description of Exemplary Inter-Network Message Translators (IMTs)

As illustrated in FIG. 1, as subscribers to the debit service system, each of the subscription networks 20, 40 preferably includes an inter-message translator (IMT) 30, 50 ("translator") in association with each of their respective debit platforms 26, 46. A translator may be associated with a wireless network by direct connection to one of the elements of the wireless network or in other manners. As also illustrated in FIG. 1, the national service hub 70 includes an inter-message translator (IMT) 75 ("translator"). Although FIG. 1 and the description of the exemplary embodiments herein assume that a translator is associated with a debit platform or other element by direct datalink connections, other configurations of the translator will occur to those skilled in the art. For example, a translator for a service provider or wireless network may reside on a network element associated with a wireless network or with an associated landline network. As such an example, a translator may be configured to reside on a service control point (SCP) in networks that include or are associated with Advanced Intelligent Network (AIN) features. Further, FIG. 1 and the description of the exemplary embodiments assume that the translator is configured as a comprehensive unit such as translator 30, 50, 75. However, the functional aspects of the translator may be divided amongst and performed by other elements as will be well understood by those skilled in the art.

Generally, the translator facilitates the exchange of information between and among wireless networks through the use of transport facilities and protocols as required by the elements of the networks with which the translator communicates, and through the use of standard inter-network messages and response messages in standard protocols such as signaling system 7 (SS7), X.25, etc. as will occur to those skilled in the art. To provide further information regarding the translator, brief examples of exemplary uses of a translator are provided. After these brief examples, further details regarding the exemplary translators are then provided.

Example—Visited Translator

A translator may be used by its associated wireless network when information or authorization is sought from another network. In particular, the translator may be used when information is sought about a wireless unit operating or roaming within the service area of the translator's associated network. In this example, the translator may be referred to as a "visited translator" in the sense that the translator may be associated with the visited network where the wireless unit is roaming. This visited translator is used by the visited wireless network to obtain information or authorization from the home wireless network of the roaming wireless unit.

Referring to FIG. 1, wireless unit 80a may be roaming in the service area of network A 20. Network A may be interested in obtaining further information such as authorization information with respect to wireless unit 80a. This authorization information also may be referred to herein as debit information. To obtain this authorization information, data is obtained by network A 20 from the wireless unit 80a in connection with the unit's registration with the network 20, and in particular, with the mobile switch 24. The data is provided to a debit platform 26. The debit platform 26 may use a certain protocol, language, format, program, etc. in carrying out its functions. The protocol, language, format, program, etc. that is used by a debit platform in this example is referred to herein as the "visitor's protocol". The visitor's protocol may be the same protocol as that used by the visited wireless network or elements thereof, or the visitor's protocol may be different from that used by the visited wireless network or elements thereof. As is described in greater detail below, one function of the translator 30 is to receive the data regarding the wireless unit from an associated debit platform 26, to translate, if necessary, the data from the visitor's protocol, to format the data into a standard inter-network communications message, and then to transmit this standard inter-network communications message with the data for further routing to another wireless network.

In this example, another function of the translator 30 may be to receive responsive information and to pass it to an associated debit platform 26. In particular, the translator 30 may receive a standard inter-network communication response message that includes authorization information from another wireless network. Upon receipt, the translator 30 may extract the authorization information from the standard inter-network communications response message, If appropriate, the translator may translate the authorization information into the visitor's protocol. Then, the translator may provide the authorization information to an associated debit platform 26.

Example—Home Translator

As another example, a translator may be used by its associated wireless network to respond to an information or authorization request ("debit information") from another network. In particular, the translator may be used when information has been requested about a wireless unit operating within the service of that other network. In this example, the translator may be referred to as a "home translator" in the sense that the translator may be associated with the home network of the roaming wireless unit. The home translator is used by the home wireless network to respond to information or authorization requests from the visited wireless network where the wireless unit is roaming. In particular, the home translator may be associated with a "home" debit platform, i.e., a debit platform that is associated with the home wireless network. The home debit platform may use a certain protocol, language, format, program, etc. in carrying out its functions. The protocol, language, format, program, etc. that is used by a debit platform in this example is referred to herein as the "home protocol". The home protocol may be the same protocol as that used by the home wireless network or elements thereof, or the home protocol may be different from that used by the home wireless network or elements thereof.

Referring to FIG. 1, wireless unit 80a may be roaming in the service area of network A 20. Network A may be interested in obtaining further information about wireless unit 80a. As described in the preceding example, a standard inter-network communications message was transmitted by the translator 30 of network 20 to the home network (network B 40) of the wireless unit. As is described in greater detail below, one function of the translator 50 is to receive a standard inter-network communications message that includes data with respect to the wireless unit from another wireless network. Upon receipt, the translator 50 may translate the data into a home protocol and provide the data to an associated debit platform 46.

In this second example, another function of the translator 50 is to receive authorization information regarding the wireless unit from an associated debit platform 46. The translator 50 may translate the authorization information from the home protocol and format the authorization information into a standard inter-network communications response message. Then, the translator 50 may transmit this standard inter-network communications response message with the authorization information for further routing to the other wireless network.

Example—Visited/Home Translator

It will occur to the careful reader that a translator may be used as "visited translator" and as a "home translator". For example, the visited/home translator may be used as visited translator to make inquiries regarding a wireless unit roaming in the service area of the network with which the translator is associated. And the visited/home translator may be used as a home translator to respond to inquiries regarding a wireless unit whose home network is the network with which the visited/home translator is associated.

Referring to FIG. 1, translator 30 may be used as a visited/home translator. As noted above in connection with the home translator example, this translator 30 may be used as a visited translator to transmit information about and to receive information regarding a roaming wireless unit 80a operating within the service area of the translator's network 20. This translator 30 also may be used as a home translator with respect to a wireless unit whose subscriber subscribes to prepaid services from network A 20. For example, a subscriber to prepaid services from network A 20 may be roaming with wireless unit 80b in the service area of network B 40. Then, this translator 30 may be used as a home translator to respond to information requests about the wireless unit 80b that is roaming in network B 40.

Example—Translator as Part of a National Service Hub

A translator may be used in association with a national service hub, and in particular, with a national debit platform to facilitate the exchange of information between a wireless network that does not have a debit platform and another wireless network that has a debit platform. In this case, the translator in the national service hub may function as a type of "visited translator" when the translator is used to transmit information about a wireless unit operating within the service area of the network without a debit platform and this information is transmitted to the home network of the wireless unit. The translator in the national service hub also may function as a type of "home translator" when the translator is used to respond to information about a wireless unit or to transmit responsive information about a wireless unit from its home network.

Referring to FIG. 1, wireless unit 80c may be roaming in the service area of network C 60. Network C transmits selected data such as debit information relating to the wireless unit 80c, which selected data may be received at the national service hub 70. The translator 75 at the national service hub 70 may receive the selected data, and if appropriate, the translator 75 may translate the selected data from the visited protocol of the network C 60. The translator 75 may format the selected data into a standard inter-network communications message, and then may transmit this standard inter-network communications message with the selected data for further routing to another wireless network. The transmission for further routing may take place in connection with other functionality of the national service hub 70 such as the call routing and call processing functions 73.

In this example, another function of the translator 75 of the national service hub 70 may be to receive a responsive message destined for wireless network C 60 and then to route that responsive message to that wireless network C 60. In particular, the translator 75 may receive a standard inter-network communications response message that is destined for the wireless network C 60. This inter-network communications response message may include authorization information from a particular wireless network, such as wireless network B 40, with respect to a wireless unit 80c that is roaming in wireless network C 60. Upon receipt, the translator 75 may extract the authorization information from the standard inter-network communications response message. The translator 75 may translate the authorization information into the visited protocol and provide it to the network C 60.

Exemplary Network Configurations of a Translator in a Wireless Network

As a receiver/transmitter of information to/from a wireless network, the association of the translator 30, 50, 75 with other wireless network elements may take one of several different network configurations. Two exemplary network configurations are illustrated in FIG. 1, and other configurations will occur to those skilled in the art. In the first network configuration as illustrated by network 20, the translator 30 is shown as having two connections. The first connection is to the debit platform 26. The other connection is to the data links that connect the mobile switch 24 of network A 20 to other networks. In this configuration, the translator 30 appears as an end node from the perspective of the public switched telephone network (PSTN). Thus, in this first configuration, service provider A's network 20 includes two inter-network connections: (1) through the translator 30; and (2) through the mobile switch 24.

A second configuration of a translator in association with a wireless network is illustrated by reference to subscription service provider B's network. In this second configuration, the translator 50 is connected between other networks, and then to the debit platform 46 and to the mobile switch 44. In this second configuration, the translator 50 may assume the functionality of a signal transfer point (STP) with respect to the direction of messages from other networks to the mobile switch 44 or to the debit platform 46.

As illustrated by these two translator configurations, the trade-off in the configurations is between complexity and reliability in the particular positioning and association of a translator in a wireless network. Of course, other configurations of a translator will occur to those skilled in the art.

Figure 2:
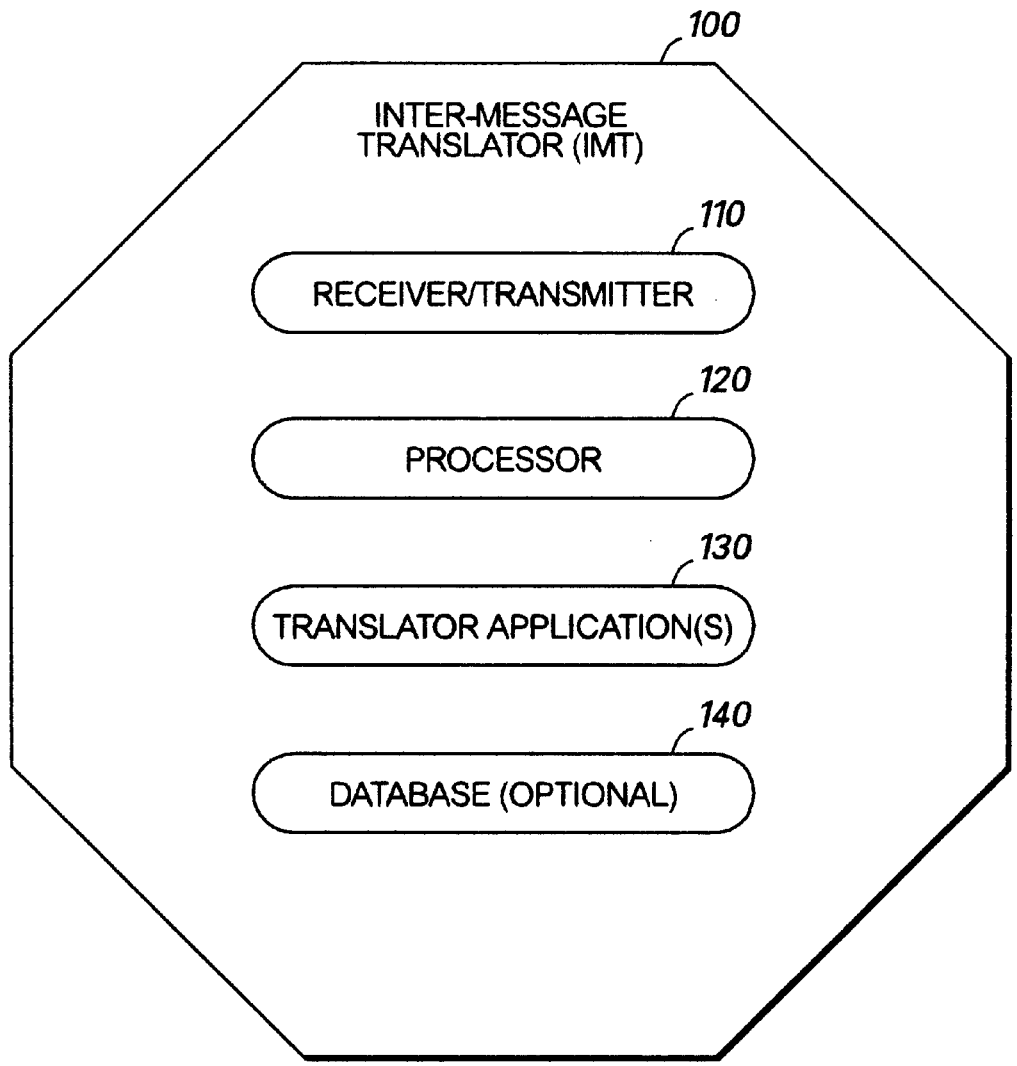
FIG. 2 is a diagram of an exemplary translator.

Exemplary Configuration of a Translator—FIG. 2

As noted above, a translator may be configured as a comprehensive unit or functional aspects of the translator may be divided amongst other elements as will be well understood by those skilled in the art. Referring to FIG. 2, preferably, a translator 100 is implemented as a stand-alone computer or as an intelligent peripheral including a receiver/transmitter 110 that is configured to communicate with network element as appropriate. For example, the translator 100 may be implemented as part of a service control point. As a further example, the receiver/transmitter 110 of translator 30 in network A 20 may be configured to receive from and transmit to the debit platform A of network A in the language or format of debit platform A. Also, the receiver/transmitter 110 of translator 30 in network A 20 may be configured to receive from and transmit to telecommunication network elements for routing of standard inter-network communication messages and response messages in such standard protocols as IS-41. Preferably, the translator 100 also includes a processor 120 and one or more software application modules which are referred to as translator application(s) 130. In the preferred embodiment, the processor 120 controls, as appropriate, the implementation of the functions carried about by the translator application(s) 130. These translator application(s) preferably handle the formatting or translation of data or information as appropriate between network elements. For example, these translator application(s) 130 may translate data from the protocol of a debit platform and format the data into a standard inter-network communications message for further routing to another network. Other translation and formatting functions of the translator application(s) 130 are described in connection with the call flow diagrams discussed below.

Further, the translator 100 may include an optional database 140. Of course, as will be well known to those skilled in the art, this computer implementation of the translator 100 may include other elements as necessary, appropriate or convenient such as a system memory (including a random access memory), a hard disk drive, an optical disk drive, associated computer-readable media (such as removable magnetic disks, magnetic cassettes, flash memory cards, digital video disks and tapes, Bernoulli cartridges, and the like), other program modules, input devices (such as a keyboard or a mouse), output devices (speakers, printers and output devices), and appropriate interfaces.

Operation of a Translator in Call Origination— FIGS. 1–4

Figure 3:
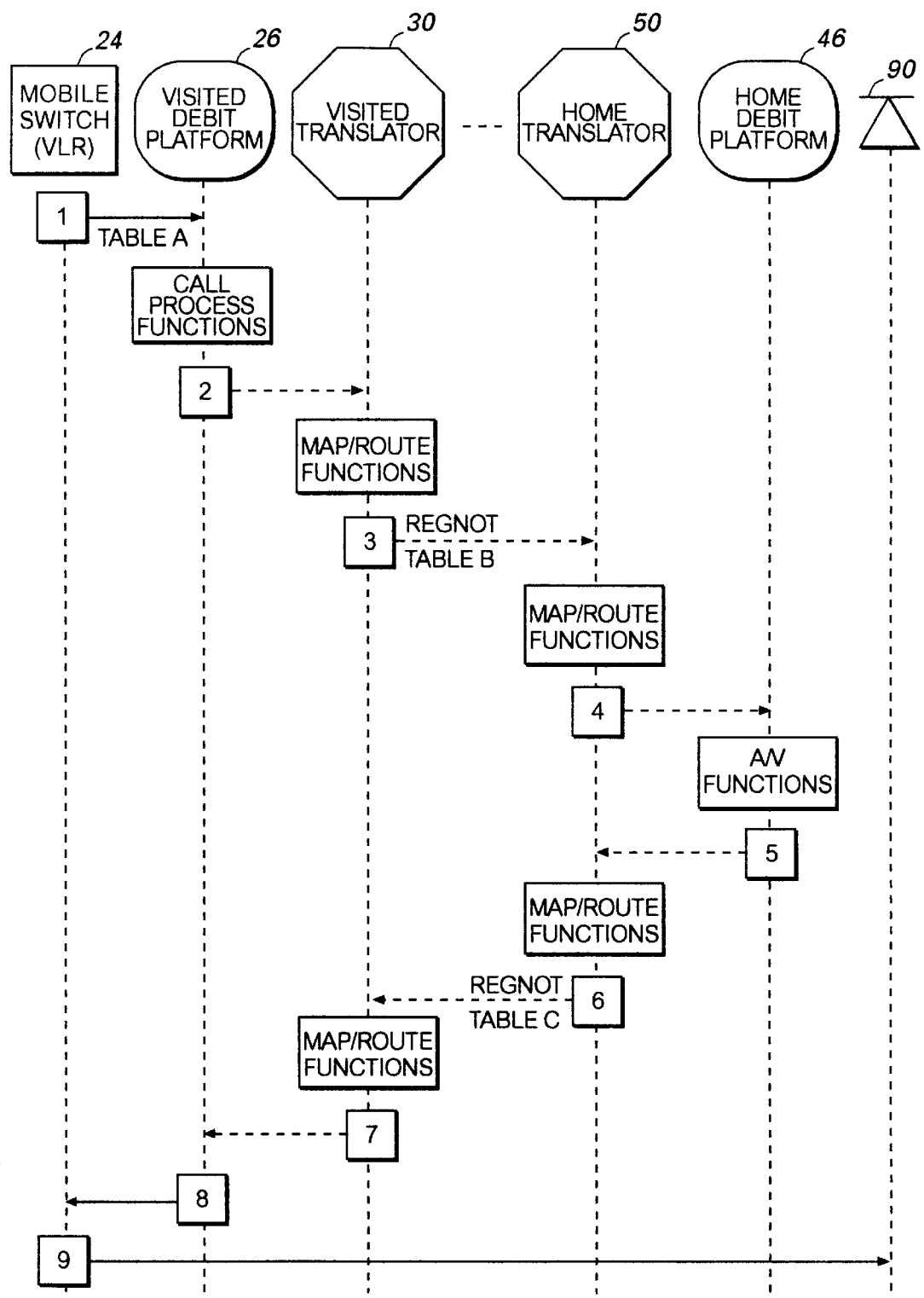
FIG. 3 is a call flow diagram with respect to the origination of a call from a debit customer in a subscription network in the exemplary environment of FIG. 1.
Figure 4:
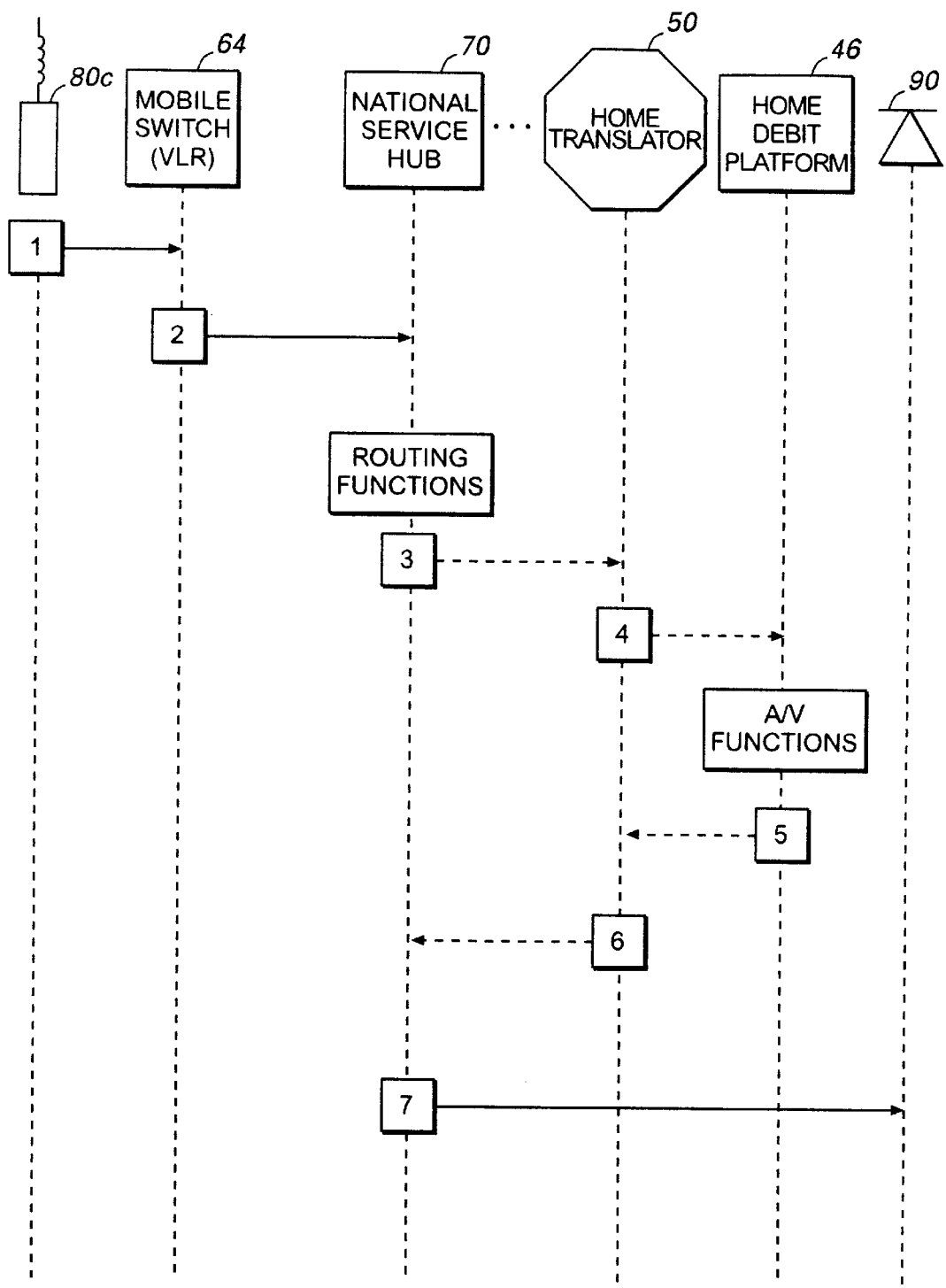
FIG. 4 is a call flow diagram with respect to the origination of a call from a debit customer in a non-subscription network in the exemplary environment of FIG. 1.

In view of the foregoing general information, more detailed operation of the exemplary translators is offered with reference to FIGS. 1–4. First, information is provided with respect to the registration of a wireless unit as a roamer in a wireless network. Then, the operation of the exemplary translators is described with reference to an origination of a communication from a roamer in a subscription network (FIG. 3), and then to an origination of a communication from a roamer in a non-subscription network (FIG. 4).

Registration of a Wireless Unit

To facilitate operation of the exemplary embodiments of the present invention, certain information may be exchanged and noted during the autonomous registration process of a wireless unit in a visited network. For example, assume that a customer is roaming with a debit unit 80a in the service area of subscription service provider A which operates wireless network A (visited network 20). Upon registration of the unit, a registration notification message is sent from the visited network 20 and is routed to the home network such as wireless network B (home network 40). The home network 40 notes the receipt of the registration notification message and preferably responds with a registration notification response message. This response message is routed from the home network 40 to the visited network 20. This response message may include information that alerts the visited network 20 that the roamer is using a debit unit. If the visited network 20 has information that the roamer is using a debit unit, then the visited network 20 may take certain action when the roamer using the debit unit initiates a communication. For example, upon receipt of a communication initiated by the roamer using the debit unit, the mobile switch 24 of the visited network 20 may provide the communication to its debit platform 26. Further processing of the communication then may be handled, at least in part, by the debit platform 26.

As another example, assume that a customer is roaming with a debit unit 80c in the service area of subscription service provider C which operates wireless network C (visited network 60). Upon registration of the unit, a registration notification message may be sent from the visited network 60 to a clearinghouse and then may be routed to a national service hub 70. The hub 70 may further route the registration notification message to the home network 40. The home network 40 notes the receipt of the registration notification message and preferably responds with a registration notification response message. This response message is routed from the home network 40 to the national service hub 70. This response message may include information that alerts the hub 70 that the roamer is using a debit unit. One way to provide this alert is to set the origination indicator parameter field to "1" in the response message. Based on this alert, the hub 70 may restrict communication origination for this debit unit such that the debit unit my only initiate communications to a single directory number, such as a toll-free number for the hub 70. One way to implement this restriction is to alter the certain parameters in the response message such as the transaction capabilities (TCAP) parameters. After these steps or changes have been accomplished by the hub 70 in the response message, the hub 70 then routes the response message to the visited network 60. Thereafter, a communication initiated by the debit unit 80c is routed from the visited network 60 to hub 70 based on the directory number that was included in the registration notification response message.

Call Origination from a Debit Roamer in a Subscription Network—FIG. 3

For this description, assume that a customer is roaming with a debit unit 80a in the service area of subscription service provider A which operates wireless network A (visited network 20). The debit unit 80a has been registered in that network. When the customer attempts to make a call from the debit unit 80a, the debit unit 80a transmits a series of standard data messages including data to the serving cell (not shown). These messages, commonly referred to as call origination, are defined by the EIA/TIA 553, referenced above. As noted, these data messages are provided first to the serving cell, and then through a datalink to the appropriate mobile telephone switching center (mobile switch 24).

At the mobile switch 24, a determination is typically made as to whether the unit is an authorized customer by using the received data messages to check whether there is an entry in the mobile switch's database corresponding to that particular unit. Preferably, the mobile switch 24 recognizes that the unit 80a is a debit unit. This recognition may take place based on the registration procedures described in the previous section. Alternatively, this recognition may be based on a review of the mobile switch's visitor location register (VLR) 23 wherein the unit 80a may be identified as a debit unit. Based on this recognition, the mobile switch 24 provides the communication and associated information such as the data to its debit platform (visited debit platform 26). (Step 1 of FIG. 3). Preferably, this data includes selected data which may include information or parameters relating to the wireless unit 80a, such as: (1) a customer identifier (Customer ID); (2) a dialed number; and (3) a long distance indicator. The customer identifier may be a mobile identification number, or some other information that identifies the customer associated with the wireless unit 80a. Table A identifies these three preferred parameters and provides a preferred parameter value for each.

TABLE A

| PARAMETER | PARAMETER VALUE |
|---|---|
| Customer ID | "10 Digit MIN" |
| Dialed Number | "NPA-NXX-XXXX" |
| Long Distance Indicator | 1/0 (Yes/No) |

Upon receipt of the information from the mobile switch 24, the visited debit platform 26 checks the information including the selected data that it receives in association with the communication. If the visited debit platform 26 determines that debit account information regarding this particular unit 80a is not resident on the debit platform 26, and in particular, is not resident on the database 29 of the debit platform 26, (Call Process Functions), then further steps are taken that involve the visited translator 30. The visited debit platform 26 initiates a query for debit account information ("debit information") regarding this particular unit 80a and transmits the query to the visited translator 30. (Step 2 of FIG. 3). As part of the query, the debit platform 26 includes the selected data regarding the unit 80a. The query and/or the selected data may be in a protocol ("visitor's protocol") that is particular to the visited debit platform. The receiver of the translator 30 receives the query, and in particular, the selected data relating to the wireless unit. The visited translator 30 reviews the information received from the debit platform 26 and formats the selected data into a message. Preferably, the translator application formats the selected data into a standard inter-network communications message. If the selected data is in the visitor's protocol, that is, if the selected data is provided in a computer language, application or format particular to the visited wireless network or to the visited debit platform, then the translator may translate the selected data from the visitor's protocol and then format the selected data into the standard inter-network communications message.

To take advantage of the existing architecture of the wireless networks and the standard protocols, the format for the message preferably is identical to a standard inter-network communications message. Preferably, the message format is an IS-41 registration notification (REGNOT) message.

As shown below, Table B illustrates a preferred Signaling System 7 (SS7) message which includes an IS-41 standard registration notification (REGNOT) message within the TCAP portion. This standard registration notification message may be adapted to provide the message including the selected data used to permit the transmission of the preferred parameters relating to the wireless unit 80a. These parameters are illustrated in italics in Table B. Those skilled in the art will understand how to implement the message so as to route the message to the appropriate network, as necessary. This implementation may require modification of the SCCP parameter such that the message is routed to the appropriate debit platform, network, hub or clearinghouse as appropriate.

TABLE B

| | PARAMETER REGNOT (REGNOT) | PARAMETER VALUE |
|---|---|---|
| MTP: | OPC: | |
| | DPC: | |
| SCCP: | Calling Party Address | |
| | PC: | "Not Used" |
| | SSN: | 5 (MAP) |
| | Called Party Address | |
| | Translation Type | |
| | Global Title Value | "10 Digit MIN" |
| | SSN: | 5 (MAP) |
| TCAP: | Mobile Identification Number (Customer ID) | "10 Digit MIN" |
| | System My Type Code (Long Distance Indicator) | 1/0 (Yes/No) |
| | PC-SSN (Dialed Number) | "NPA-NXX-XXXX" |

After the visited translator 30 maps the selected data into a standard inter-network communications message, this message then is transmitted by the transmitter of the translator 30 for further routing to the appropriate network or other element. (Step 3 of FIG. 3). In the example illustrated using FIG. 1, the visited translator 30 transmits the standard inter-network communications message to the home wireless network 40 of the wireless unit 80. This message is routed pursuant to conventional routing techniques to the home network 40, and in particular, to the home translator 50 of the home network 40.

If the message did not route directly to the home translator 50, then preferably, upon receipt of the message, the home network 40 recognizes that the message contains selected data relating to a debit unit 80a and the message is provided to the home translator 50. The receiver of the home translator 50 preferably receives the standard inter-network communications message including the selected data relating to the wireless unit 80a. The translator application of the home translator extracts the selected data relating to the wireless unit from the standard inter-network communications message. The translator application preferably translates the selected data into the home protocol, such as the protocol or language of the home wireless network. The transmitter transmits the selected data relating to the wireless unit, and if appropriate, transmits the selected data in the home protocol, to an element of the home wireless network. The visited translator 50 preferably translates the selected data in the message into a format or language that is understood or compatible with the language communication protocols of the home network, and specifically, with the language communication protocols of the debit platform 46 of the home network. The translator 50 transmits this translated selected data to the home debit platform 46 (Step 4 of FIG. 3). The debit platform 46 in communication processes the translated selected data, and conducts authorization or validation checks (A/V Functions) so as to obtain search results.

Upon obtaining search results, the home debit platform 46 preferably sends a response message to the visited network 20. As a part of the process of sending the response message, the home debit platform 46 transmits, inter alia, authorization information regarding the received message to its associated translator 50 (Step 5 of FIG. 3).

Upon receipt of the information, the home translator 50 may be used to receive authorization information with respect to the wireless unit 80*a* from the home wireless network 40 and to pass this information on to the visited wireless network 20. To accomplish this transfer of information, the receiver of the home translator 50 receives authorization information relating to the wireless unit 80*a* from an element of the home wireless network 40. This element may be the home debit platform 46 of the home wireless network 40. The translator application of the home translator 50 formats the authorization information into a standard inter-network communications response message, which is responsive to the standard inter-network communications message. If the authorization information is in the protocol, then the translator application may translate the authorization information from the home protocol and format the authorization information into the response message. The transmitter then transmits the standard inter-network communications response message to an element of the visited wireless network 20.

Preferably, this response message is identical to a standard inter-network communications response message. It is preferred that the response message format is an IS-41 registration notification (regnot) response message that is typically transmitted by a home mobile switch to a mobile switch in a visited network. However, pursuant to the exemplary embodiments, the response message includes authorization information regarding the wireless unit 80*a*. This authorization information may include three preferred parameters relating to the wireless unit 80*a*: (1) a customer identifier (Customer ID); (2) an authorization; and (3) an account balance. Table C, below, illustrates a preferred IS-41 standard registration notification (regnot) response message.

TABLE C

| | PARAMETER REGNOT (REGNOT) | PARAMETER VALUE | TCAP FIELD LENGTH (Ocrets) |
|---|---|---|---|
| RETURN RESULT | System My Type Code | XXX (Ignored) | 1 |
| | Authorization Denied (Authorizaion) | 7/8 (Deny/Accept) | 1 |

TABLE C-continued

| PARAMETER REGNOT (REGNOT) | PARAMETER VALUE | TCAP FIELD LENGTH (Ocrets) |
|---|---|---|
| Authorization Period (Account Balance) | 0–255 (Hours) 0–59 (Minutes) | 2 |
| Origination Indicator | XXX (Ignored) | 1 |
| Digits (destination) (Customer ID) | "10 Digit MIN" | variable |
| Termination Restriction Code | XXX (Ignored) | 1 |
| Calling Features Indicator | XXX (Ignored) | variable |
| Digits (Carrier) | XXX (Ignored) | variable |

After the home translator 50 maps the authorization information into a standard inter-network communications response message, this response message then is transmitted by the translator 50 for routing in a conventional manner to the visited network. (Step 6 of FIG. 3).

Further referring to FIG. 3, the visited network 20 recognizes that the response message contains authorization information relating to the debit unit 80*a*. Thus, the message is provided to the visited translator 30. The receiver of the visited translator 30 receives the standard inter-network communications response message including the authorization information relating to the wireless unit 80*a*. The translator application of the visited translator 30 extracts the authorization information relating to the wireless unit 80*a* from the standard inter-network communications response message. The translator application may translate the authorization information to the visitor's protocol. The transmitter then transmits the authorization information to an element of the visited wireless network 20. (Step 7 of FIG. 3).

The visited debit platform 26 in communication with the visited mobile switch 24 processes the translated authorization information and proceeds appropriately depending on whether the authorization information indicates a valid and authorized unit or an invalid and unauthorized unit. For example, if the authorization information indicates that the debit unit 80*a* is a valid and authorized unit, then the visited debit platform 26 places a call to the number dialed by the customer of the unit 80*a* (i.e., the dialed number). (Step 8 of FIG. 3) If this call is answered, then the communication associated with the debit unit 80*a* may be bridged onto the call, and the visited debit platform 26 starts a timer to measure the duration of the communication. (Step 9 of FIG. 3). Of course, if the authorization information indicates that the debit unit 80*a* is invalid or is unauthorized with respect to telecommunications, or certain services thereof, then telecommunication services are denied to the unit 80*a* as appropriate based on the authorization information and its processing.

Call Origination from a Debit Roamer in a Non-Subscription Network—FIG. 4

It is advantageous for a service provider that offers debit units and other prepaid services to provide such telecommunication services to the debit units even when the debit units are roaming in the service area of another service provider that does not include a translator or other debit service system. For this description, assume that a customer is roaming with a debit unit 80*c* in the service area of non-subscription service provider C which operates wireless network C (visited network 60). The debit unit 80*c* has been registered in that network pursuant to the standard procedures regarding a wireless unit as described above in the registration section. When the customer attempts to make a call from the debit unit 80c, the debit unit 80c transmits a series of standard call origination data messages including selected data to the serving cell (not shown). As noted, these data messages are provided first to the serving cell, and then through a datalink to the appropriate mobile telephone switching center (mobile switch 64). (Step 1 of FIG. 4).

As noted above, in the preferred embodiments, during the registration process of a debit unit in a non-subscription service provider's network, communications from this debit unit 80c have been restricted to a single telephone number. This is a telephone number that routes calls from the debit unit 80c to the national service hub 70, and thus, preferably, to the national debit platform 72. Thus, the communication from the wireless unit 80c is preferably routed from visited mobile switch 64 to the national service hub 70. (Step 2 of FIG. 4).

Upon receipt of the communication to the designated telephone number, the national service hub 70 (and in particular, the national debit platform 72) preferably recognizes the debit unit 80c as associated with a customer of a service provider which subscribes to a debit service system. The national debit platform 72 may have information regarding the debit unit 80c gained during or as an adjunct process to the registration of the unit in network C 60. The national debit platform 72 then may function as an exemplary "visited debit platform" and the translator (IMT) 75 of the national service hub may function as an exemplary "visited translator" with respect to the home wireless network or otherwise, and as explained above in connection with the functions of visited debit platform 26 and translator 30 in the discussion of FIG. 3. Thus, the translator 75 associated with the national debit platform 72 may receive the selected data relating to the wireless unit from the non-subscription wireless network 60. The translator application formats the selected data into a standard inter-network communications message. A transmitter then transmits the standard inter-network communications message for routing to the home network 40. (Step 3 of FIG. 4). In the example illustrated using FIG. 1 and FIG. 3, the translator 75 transmits the standard inter-network communications message to the home wireless network 40 of the wireless unit 80. This message is routed pursuant to conventional routing techniques to the home network 40, and in particular, to the home translator 50 of the home network 40.

The home network 40 receives the communication from the national service hub 70 and recognizes that the communication relates to a debit unit 80c. Preferably, the Steps 4–6 at the home network 40 for this example are generally the same as the Steps 4–6 for the example discussed above in connection with FIG. 3. The reader is referred to the previous discussion of Steps 4–6 of FIG. 3 for the Steps 4–6 of FIG. 4.

The home translator 50 may proceed as described generally in connection with Steps 5–6 of FIG. 3, except that the transmitter of the home translator transmits the standard inter-network communications response message to the national service hub 70, where it may be received by the translator 75. The translator at the national service hub 70 takes steps with respect to this standard inter-network communications response message which are comparable to the steps taken by the visited translator 30 in the example discussed in connection with Step 7 of FIG. 3. The receiver of the translator 75 receives the standard inter-network communications response message including the authorization information relating to the wireless unit 80c. The translator application of the translator 75 extracts the authorization information relating to the wireless unit 80c from the response message. The translator application may translate the authorization information to the protocol of the national debit platform 72. The transmitter then transmits the authorization information to national debit platform 72.

The national debit platform 72 processes the authorization information and proceeds appropriately depending on whether the search results indicate that the unit 80c is a valid and authorized unit or an invalid and unauthorized unit. For example, if the debit unit 80c is a valid and authorized unit, then the national debit platform 46 places a call to the number dialed by the customer of the unit 80c (i.e., the dialed number). (Step 7 of FIG. 4) This call may be answered or unanswered. If this call is answered, then the communication associated with the debit unit 80c is bridged onto the call, and the debit platform starts a timer to measure the duration of the communication. Of course, if the authorization information indicates that the debit unit 80c is invalid or is unauthorized with respect to telecommunications, or certain services thereof, then telecommunication services are denied to the unit 80c as appropriate based on the authorization information and its processing.

Figure 5:
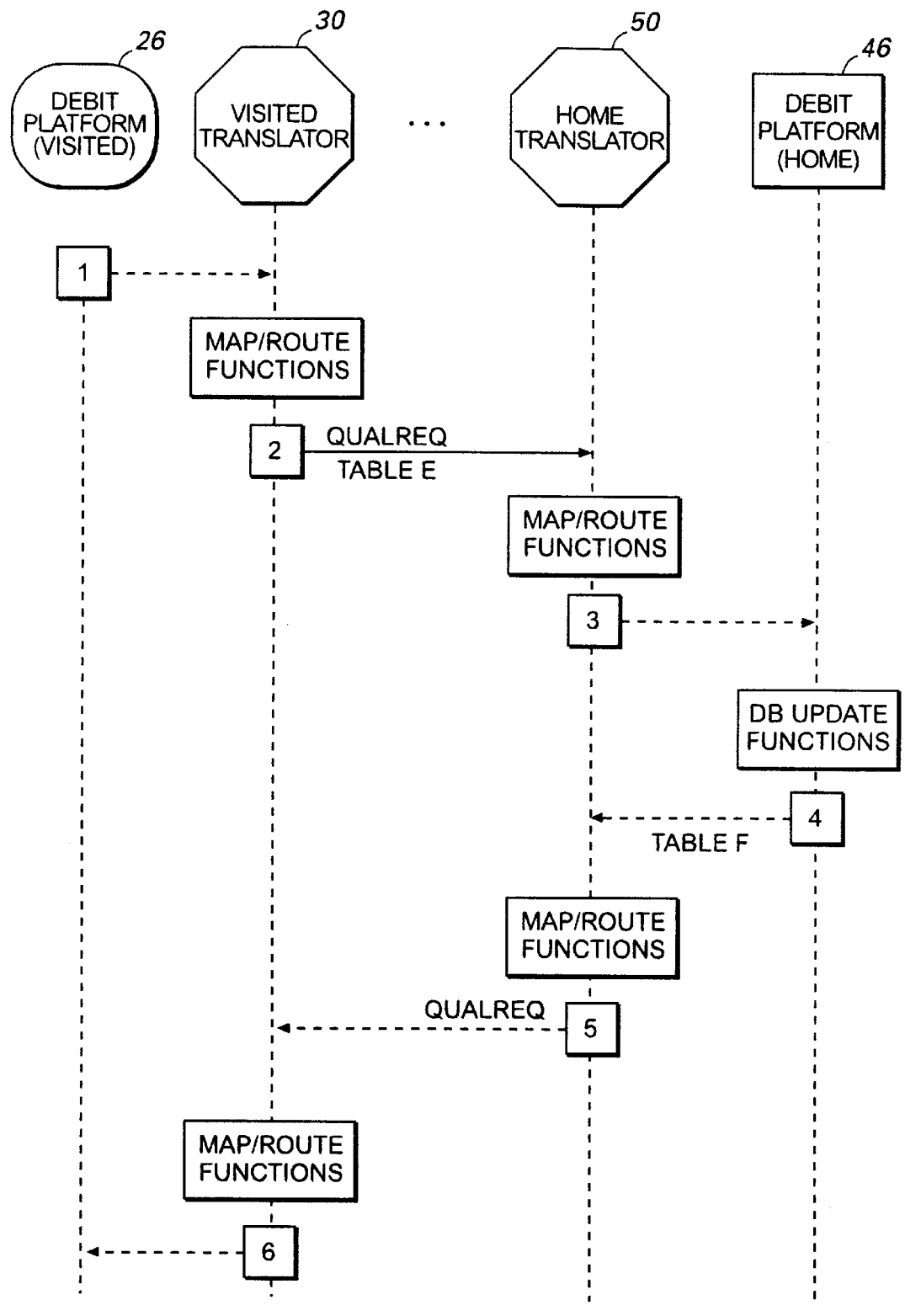
FIG. 5 is a call flow diagram with respect to the termination of a call from a debit customer in a subscription network in the exemplary environment of FIG. 1.

Termination of a Call that Originates from a Wireless Unit in the Debit Service System—FIGS. 1, 5

The preceding sections discussed the call flows with respect to a wireless unit that originated a communication in a subscription network (FIG. 3) and in a non-subscription network (FIG. 4). A communication that is initiated by a wireless unit is, of course, also ended or terminated. The exemplary embodiments are now described with reference to the termination of a call that originates from a roamer in a subscription network (FIG. 5) and from a roamer in a non-subscription network (no drawing).

Termination of a Call that Originates from a Debit Roamer in a Subscription Network—FIG. 5

For this description, assume that a customer is roaming with a debit unit 80a in the service area of subscription service provider A which operates wireless network A (visited network 20). Further, assume that the customer is engaged in a communication using the debit unit 80a. Upon terminating the communication by hanging up or otherwise, certain information must be passed from the visited network 20 to the home network 40 so as to properly account for the services that were provided in connection with the communication to the wireless unit 80a. For example, if a certain amount was prepaid into an account for the provision of services to the debit unit 80a, an amount may be deducted from this account as payment for the services that were provided in connection with the communication. This amount to be deducted may be based on several factors including the duration of the communication, whether long distances services were provided, etc. The preferred embodiments provide for the transmission of this certain information from the visited network 20 to the home network 40.

As noted above in connection with call origination from a debit unit 80a operating in a subscription network (FIG. 3), a communication bridge exists between, on the one hand, the communication from the wireless unit 80a and the visited debit platform 26, and on the other hand, the call from the visited debit platform 26 to the dialed number. When the wireless unit 80a hangs up or otherwise terminates the communication, this bridge is torn down. The visited debit platform 26 recognizes that certain information regarding the terminated communication must be transmitted to the home debit platform 46 of the wireless unit 80a. Referring to FIG. 5, the visited debit platform 26 provides this certain information to the visited translator 30. (Step 1 of FIG. 5).

Upon receipt of the certain information regarding the terminated communication, the translator 30 translates, maps or formats this data from this information into a message. This data is referred to herein as termination data. To take advantage of the existing architecture of the wireless networks and the standard protocols, the format for the message preferably is identical to a standard inter-network communications message. Preferably, the message format is an IS-41 qualification_request (QUALREQ). However, pursuant to the preferred debit service system 10, the message includes data regarding the terminated communication, and the wireless unit 80a. Preferably, this data may includes four preferred pieces of information or parameters: (1) a customer identifier (Customer ID); (2) a dialed number; (3) a long distance indicator; and (4) call duration. The call duration parameter may be either in time or in fees. Preferably, that parameter is indicated with a dollar amount. Table D identifies these preferred parameters and provides a preferred parameter value for each.

TABLE D

| PARAMETER | PARAMETER VALUE |
| --- | --- |
| Customer ID | "10 Digit MIN" |
| Dialed Number | "NPA-NXX-XXXX" |
| Long Distance Indicator | 1/0 (Yes/No) |
| Call Duration | "Minutes or $" |

As shown below, Table E illustrates a preferred IS-41 standard qualification_request (QUALREQ) message. This standard qualification_request message has been adapted to provide the message including the data used in connection with the preferred debit service system to permit the transmission of four preferred parameters relating to the wireless unit 80a. These parameters are illustrated in italics in Table E.

TABLE E

| | PARAMETER QUALREQ (QUALREQ') | PARAMETER VALUE |
| --- | --- | --- |
| MTP: | OPC: | "VDPA" |
| | DPC: | "BellSouth Hub" |
| SCCP: | Calling Party Address | |
| | PC: | "Not Used" |
| | SSN: | 5 (MAP) |
| | Called Party Address | |
| | Translation Type | 198 (Debit Wireless) |
| | Global Title Value | "10 Digit MIN" |
| | SSN: | 5(MAP) |
| TCAP: | Mobile Identification Number (Customer ID) | "10 Digit MIN" |
| | Qualification Information Code (Hours) | 0–255 (Hours) |
| | System My Type Code (Minutes) | 0–59 (Minutes) |

After the visited translator 30 maps the termination data into a standard inter-network communications message, this message then is transmitted by the translator 30 for routing to the home network 40 of the wireless unit 80a. (Step 2 of FIG. 5).

The home network 40 receives the message and recognizes that the message contains termination data relating to a debit unit 80c. Thus, the message is provided to the home translator 50 associated with the home network 40. The home translator 50 reviews and may translate the message. In particular, the translator 50 preferably translates the termination data in the message into a format or language that is understood or compatible with the communication protocols of the home network, and specifically, with the communication protocols of the debit platform 46 of the home network. The translator 50 transmits this translated termination data to the debit platform 46 and/or the mobile switch 44 as appropriate (Step 3 of FIG. 5). The debit platform 46 in communication with the home mobile switch 44 processes the translated termination data, and updates the account information relating to this wireless unit 80a (DB UPDATE FUNCTIONS). For example, the debit platform 46 may use the translated termination data to decrement the account associated with the unit 80a in the account information in the database 49.

After updating the account information relating to the wireless unit 80a, the home network 40 sends a message to the visited network 20. Preferably, this acknowledgment message may include acknowledgment information of two preferred pieces of information or parameters relating to the termination data or to the wireless unit 80a: (1) a customer identifier (Customer ID); and (2) a dialed number. Table F identifies these two preferred parameters and provides a preferred parameter value for each.

TABLE F

| | PARAMETER | PARAMETER VALUE |
| --- | --- | --- |
| RETURN RESULTS (VDP←HDP) | Customer ID | "10 Digit MIN" |
| | Dialed Number | "NPA-NXX-XXXX" |

As a part of the process of sending the acknowledgment message to the visited network, the home debit platform 46 transmits the acknowledgment message to its associated translator 50 (Step 4 of FIG. 5). The acknowledgment message may include information other than the acknowledgment information.

Upon receipt of the acknowledgment message from the debit platform 46, the translator 50 translates or maps the acknowledgment information into an acknowledgment message. To take advantage of the existing architecture of the wireless networks and the standard protocols, the format for this acknowledgment message preferably is identical to a standard inter-network communications acknowledgment message. Preferably, the acknowledgment message format is an IS-41 qualification request (qualreq) acknowledgment message. However, the acknowledgment message includes acknowledgment information. Preferably, this acknowledgment information includes the two preferred parameters listed above in Table F.

After the home translator 50 maps the acknowledgment information into a standard inter-network communications acknowledgment message, this acknowledgment message then is transmitted by the translator 50 for routing in a conventional manner to the visited network. (Step 5 of FIG. 5).

Further referring to FIG. 5, the visited network 20 receives the acknowledgment message recognizes that the acknowledgment message contains acknowledgment information relating to the debit unit 80a. Thus, the message is provided to (if it is not initially received by) the visited translator 30 associated with the visited network 20. The translator 30 reviews and translates the acknowledgment message. In particular, the translator 30 preferably translates the acknowledgment information in the acknowledgment message into a format or language that is understood or compatible with the communication protocols of the visited network, and specifically, with the communication protocols of the debit platform 26 of the visited network 20. If the acknowledgment information is in a standard inter-network communications language, then the translator application may translate the acknowledgment information from the standard inter-network communications language to the visitor's language. The visited translator 30 transmits this translated acknowledgment information to the debit platform 26 and/or the mobile switch 24 as appropriate (Step 6 of FIG. 5). The debit platform 26 in communication processes the translated acknowledgment information.

Termination of a Call that Originates from a Debit Roamer in a Non-Subscription Network For this description, assume that a customer is roaming with a debit unit 80c in the service area of non-subscription service provider C which operates wireless network C (visited network 60). Further, assume that the customer is engaged in a communication using the debit unit 80c. Upon terminating the communication by hanging up or otherwise, certain information must be available to the home network 40 so as to properly account for the services that were provided in connection with the communication to the wireless unit 80c. The type of information that must be available to the home network in this example is the same type of information that must be passed from a subscription network to a home network as in the previous example. In both examples, the need is the same for the information is the same with respect to the use of the information to keep proper accounts with respect to the debit unit.

As noted above in connection with call origination from a debit unit 80c operating in a non-subscription network (FIG. 4), a communication bridge exists between, on the one hand, the communication from the wireless unit 80c and the national service hub 70 (and in particular, the national debit platform 72), and on the other hand, the call from the national service hub 70 (national debit platform 72) to the dialed number. When the wireless unit 80c hangs up or otherwise terminates the communication, this bridge is torn down. The national debit platform 72 recognizes that certain information regarding the terminated communication must be used at the home debit platform 46 of the wireless unit 80c. Preferably, this certain information includes data (termination data) such as the following four preferred pieces of information or parameters: (1) a customer identifier (Customer ID); (2) a dialed number; (3) a long distance indicator; and (4) call duration.

The home debit platform 46 processes the termination data, and updates the account information relating to this wireless unit 80c (DB UPDATE FUNCTIONS). For example, the home debit platform 46 may use the translated termination data to decrement the account associated with the unit 80c in the account information in the database 49.

Conclusion

The preferred embodiments of the present invention are disclosed in the context of exemplary embodiments of a translator that may be used in connection with a debit service system or debit service methods. These embodiments particularly facilitate the exchange of information between and among wireless networks with respect to the authorization of a particular wireless unit to make and/or to receive a communication in a particular wireless network. Those skilled in the art will appreciate that the principles of the present invention may be applied so as to provide alternate systems and services based on the principles described in the context of the preferred embodiment. Other modifications may occur to those skilled in the art without departing from the scope and spirit of the appended claims.

I claim:

1. A service system for facilitating the transmission of information with respect to a wireless unit in a visited wireless network from said visited wireless network to the home wireless network of said wireless unit, said service system comprising:

a first translator associated with said visited wireless network, said first translator further comprising:
 a first receiver for receiving data in a visitor's protocol of said visited wireless network from an element of said visited wireless network, said data relating to said wireless unit
 a first translator application for translating said data from said visitor's protocol and formatting said data into a standard inter-network communications message; and
 a first transmitter for transmitting said standard inter-network communications message to a second translator; and said second translator being associated with said home wireless network, said second translator further comprising:
 a second receiver for receiving said standard inter-network communications message including said data from said first translator;
 a second translator application for extracting said data from said standard inter-network communications message and for translating said data into a home protocol of said home wireless network; and
 a second transmitter for transmitting said data in said home protocol to an element of said home wireless network.

2. The service system of claim 1, wherein said element of said visited wireless network is a visited debit platform.

3. The service system of claim 1, wherein said element of said home wireless network is a home debit platform.

4. A method for transmitting information with respect to a wireless unit in a visited wireless network from said visited wireless network to the home wireless network of said wireless unit, said method comprising the steps of:

at a first element associated with said visited wireless network:
 receiving data in a visitor's protocol of said visited wireless network from an element of said visited wireless network, said data relating to said wireless unit,
 translating said data from said visitor's protocol,
 formatting said data into a standard inter-network communications message, and
 transmitting said standard inter-network communications message to a second element; and at said second element, said second element being associated with said home wireless network,
 receiving said standard inter-network communications message including said data from said first element,
 extracting said data from said standard inter-network communications message,
 translating said data into a home protocol of said home wireless network, and transmitting said data in said home protocol to an element of said home wireless network.

5. In or for a wireless communications system including a home wireless network of a wireless unit and a visited wireless network of said wireless unit, a debit service system for obtaining authorization information with respect to providing telecommunication services to said wireless unit in said visited wireless network, said debit service system comprising:

a visited debit platform associated with said visited wireless network, and said visited debit platform being operative to provide data in a visitor's protocol to a visited translator, said data relating to said wireless unit;

said visited translator being associated with said visited wireless network and functionally connected to said visited debit platform, said visited translator being operative to receive said data in said visitor's protocol from said visited debit platform, to translate said data from said visitor's protocol, to include said data in a message, said message being formatted by said visited translator as a standard inter-network communications message, and to transmit said message to said home wireless network;

a home translator associated with said home wireless network, and operative to receive said message, to extract said data from said message, to translate said data into a home protocol of said home wireless network, and to provide said data to a home debit platform;

said home debit platform being functionally connected to said home translator and being associated with said home wireless network, said home debit platform being operative to receive said data in said home protocol from said home translator;

to determine the authorization of said wireless unit, and to provide authorization information in said home protocol to said home translator;

said home translator being further operative to receive said authorization information in said home protocol from said home debit platform, to translate said authorization or acknowledgment information from said home protocol;

to include said authorization information in a response message, said response message being formatted by said home translator as a standard inter-network communications response message, and to transmit said response message to said visited wireless network;

said visited translator being further operative to receive said response message, to extract said authorization information from said response message, to translate said authorization information into said visitor's protocol, and to provide said authorization information in said visitor's protocol to said visited debit platform; and said visited debit platform being further operative to provide said authorization information to said visited wireless network.

* * * * *